Dec. 27, 1966  R. S. HOWE, JR  3,294,459
ECCENTRICALLY LOCKABLE BEARING CHARACTERIZED BY IMPROVED
RESISTANCE TO FRETTING CORROSION
Filed Dec. 14, 1964

INVENTOR.
RALPH S. HOWE, JR.

BY
Hopgood & Calimafde
ATTORNEYS.

United States Patent Office 3,294,459
Patented Dec. 27, 1966

3,294,459
ECCENTRICALLY LOCKABLE BEARING CHARACTERIZED BY IMPROVED RESISTANCE TO FRETTING CORROSION
Ralph S. Howe, Jr., New Britain, Conn., assignor to The Fafnir Bearing Company, New Britain, Conn., a corporation of Connecticut
Filed Dec. 14, 1964, Ser. No. 417,993
10 Claims. (Cl. 308—236)

My invention relates to an eccentrically lockable anti-friction bearing and, in particular, to an anti-friction bearing having a locking collar for eccentrically locking or binding the inner ring of the bearing to a shaft while reducing fretting corrosion between the bearing and the shaft.

Anti-friction bearings are known having an inner ring which is secured to a shaft by means of a locking collar which coacts with one end of the ring. One such device is disclosed in U.S. Patent No. 2,584,740 which issued on February 5, 1952, to Harry R. Reynolds. In the bearing device there disclosed, the ring and the collar are locked to the shaft by relative rotation of eccentrically formed interfitting surfaces on the collar flange and on the flange of the inner bearing ring. By providing eccentrically formed interfitting annular flanges in both the ring and the collar, camming surfaces are provided which coact to effect locking or binding of the inner ring to the shaft. This achieved by rotating one interfitted flange relative to the other whereby the binding end of the ring is caused to be cocked or tightly jammed against the shaft in locking engagement therewith.

It has been found that one of the disadvantages of this method of assembly is that it is extremely difficut to remove the bearing after service in the field on agricultural or industrial equipment. Generally, fretting corrosion occurs at the binding end region of the ring because of the high binding stresses which prevail at that end and also at the region diagonally opposite to the binding end, thus causing the inner ring to freeze or bind, so to speak to the shaft. Steel bearings are generally subject to atmospheric corrosion and in addition a fretting corrosion occurs with the formation of red oxide between the fitted surfaces which occurs near the ends of the fit. Fretting corrosion is sometimes known as "friction oxidation" or "rubbing corrosion" and is one of the most severe forms of weakening action on fatigue strength leading to eventual breakage of the bearing. Atmospheric corrosion of the bearing rings should be avoided as much as possible. This is also true of the seal rabbets against which the seals rub.

I now find that I can materially reduce the foregoing difficulty and provide a bearing capable of being used for long periods of time in the field and still be capable of being removed easily from the shaft when it is desired to do so.

It is thus an object of my invention to provide a new and improved self-locking bearing and collar combination.

Another object is to provide a self-locking anti-friction bearing securable to a shaft by means of a collar and capable after prolonged periods of use in the field of being easily removed from the shaft.

These and other objects will more clearly appear when taken in conjunction with the following disclosure and the appended drawings, wherein.

I have found that I can overcome the difficulties mentioned hereinbefore by providing the bore of the inner ring with a thin coating of soft lubricating metal such as cadmium, provided the thickness of the coating at the locking end is greater than at the center of the bore. Thus, when the bearing is force-fitted on the shaft and the collar is attached to one end of the inner ring and the inner ring eccentrically locked in place by rotating the collar relative to the ring, the cocking of the inner ring against the shaft causes the cadmium to flow between the shaft and the ring. The locking stresses are dissipated in deforming the layer of cadmium. Thus, fretting corrosion is greatly minimized, if not avoided.

Figure 1:
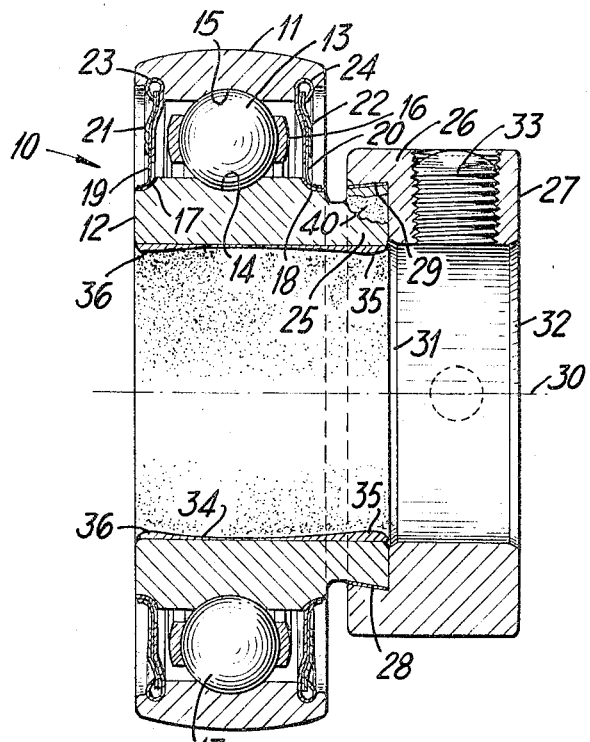
FIG. 1 is a cross section of an anti-friction bearing and attached collar.

Referring to FIG. 1, an anti-friction bearing 10 is shown comprising an outer race ring 11, which may be mounted in a pillow block or other means (not shown), an inner race ring 12 concentrically located within the outer ring, and a plurality of anti-friction elements 13 riding inner and outer race grooves 14 and 15, respectively, the elements being held in place by retainer 16.

Annular seal rabbets 17 and 18 are provided at each end of the inner ring against which the ends of resilient seals 19 and 20 are held in wiping engagement. The seals are held between annular metal shields 21, 22 each of which has a peripheral spring clip or loop portion 23 and 24 fitted into annular grooves in the outer bearing ring as shown.

Figure 2:
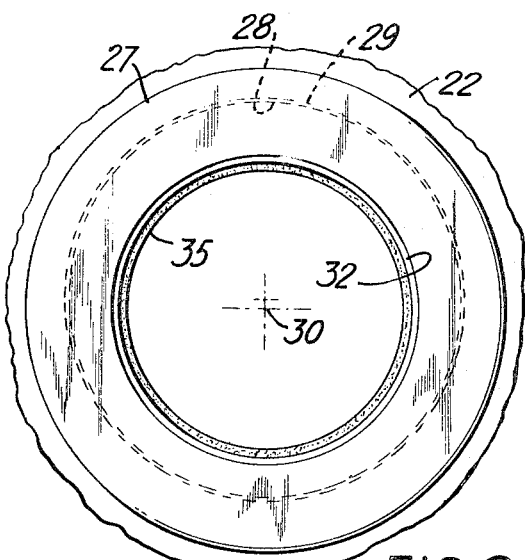
FIG. 2 is an end view looking into the open end of the locking collar which is attached to the end of the inner ring of the bearing.

The inner ring has an axially extending end or flange 25 overlapped by a flange 26 on the locking member or collar 27. The flange 25 and flange 26 are provided with interfitting arcuate surfaces 28 and 29, respectively, eccentric with respect to the axis of rotation 30. The axis of eccentricity is generally parallel to the axis of rotation and displaced from it. The eccentricity of the coupling means of the locking collar will be apparent from FIG. 2 which is a view looking into the collar from the left side of FIG. 2. Arcuate camming face 29 is shown in FIG. 2, the camming face having a frusto-conical configuration. Arcuate surface 28 of the inner ring is likewise frusto-conical in shape.

The inside edge of the locking collar is bevelled at 31 as is the outside edge at 32. The collar has a set screw 33 for binding it to the shaft after the bearing is mounted. When it is desired to mount the bearing, the inner ring 12 is rotatably positioned relative to the collar so that the diametrically opposed portions of the respective eccentric flanges or ends are most spread apart to enable a sliding fit of the interfitting arcuate camming surfaces. When the desired position has been ascertained, the collar and the inner ring are then manually rotated with respect to each other to effect binding of the assembly on the shaft. The set screw is then driven into abutment with the shaft.

To avoid fretting corrosion, however, the bore of the inner ring is plated with a layer of cadmium 34, the plating being such that it is thicker at region 35 near the extending end portion of the inner ring and region 36 opposite to the binding end. Preferably, the bearing rings are plated all over so as to cover the seal rabbets to protect them against corrosion and the race then ground. The thin layer of cadmium on the seal rabbets is also desirable for maintaining the seal friction to a minimum. In addition, by avoiding oxidation of the seal rabbets, seal wear is minimized.

I have found that for a one inch bore, the diameter at the center of the inner ring after depositing a cadmium plate of about 0.0005 inch is about 1.0004, as against about 0.9997 at the outside regions of the bore. The plate near the outside region is about 0.00035 inch thicker than at the center of the bore (1.0004 less 0.9997 and dividing by two).

Figure 3:
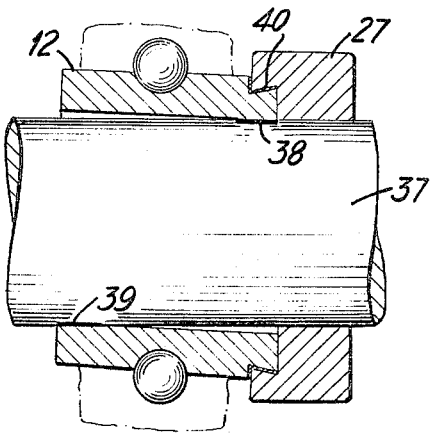
FIG. 3 depicts an exaggerated cross section of the inner ring showing the cocking action against the shaft.

In FIG. 3, the inner ring 12 is shown somewhat exaggerated cocked against shaft 37 by locking collar 27, the inner ring being jammed against the shaft at diagonally opposite regions shown in heavy lines at 38 and 39, respectively. It is in these regions where fretting corrosion tends to occur. The flange portion 40 is also preferably cadmium plated to reduce stress concentrations arising from the binding action of collar 27.

In cadmium plating the bearing rings, the rings are first soaked in a hot alkali cleaner for at least 7 minutes or until the oil and dirt are removed. The alkali concentration is preferably about 6 oz./gallon. The temperature of the solution is 180° to 200° F. After the soak is completed, the rings are rinsed in hot water and then anodically cleaned in the hot alkali cleaner followed by another hot water rinse. The rinsed parts are then dipped in a 50% mixture by volume of hydrochloric acid and water and followed by a hot and then a cold water rinse.

Preparatory to plating, the parts are dipped in a strong solution of cyanide and water.

The plating is carried out in a 30 inch barrel (40 sq. ft. capacity) for approximately one hour. This will deposit a thickness of about 0.0004″ of cadmium using a barrel amperage of about 200 amperes to provide a current density in the range of about 5 to 25 amps/sq. ft. The composition of the bath comprises per gallon of solution 3 oz. of cadmium oxide, 2 to 2.5 oz. of cadmium metal, 13 oz. of sodium cyanide, 8 to 10 oz. of free cyanide, 2 to 3 oz. of sodium hydroxide, 2 to 8 oz. of sodium carbonate and the usual brightener as required.

After completion of the plating, the parts are rinsed in cold water to prevent staining and then bright dipped in a solution containing 1 lb. of chromic acid and 20 c.c. of concentrated sulfuric acid per gallon of water. This is then followed by a cold water rinse to remove all chromic acid.

When the assembled bearing cadmium-plated bore is slipped onto the shaft and the collar coupled to it and rotated relative to the inner ring, the inner ring is cocked against the shaft so that the end of the bore where the cadmium plate is the thickest bears against the shaft. The cadmium being very soft absorbs the stresses set up at the opposite ends of the inner ring and prevents these areas from being subject to fretting corrosion by minimizing "friction oxidation" or "rubbing corrosion" which normally occurs when cadmium or a similar plate is not employed.

While cadmium metal is referred to by way of example as the plating metal employed, other soft white metals may be employed such as zinc, indium, tin, lead and similar white metals. In achieving the results of the invention, it is important that the plating be thicker at the opposite ends of the bore as compared to the thickness at the center. Generally speaking, for an average plating thickness of about 0.0002 to 0.001 inch, the thickness at least at the region at the locking end should be anywhere from about 0.0002 to 0.0008 inch thicker than at the center region of the bore. The seal rabbets should likewise have a thin plating to minimize seal friction.

While the present invention has been described in conjunction with a preferred embodiment, it is to be understood that modifications and variations may be resorted to without departing from the spirit and scope of the invention as those skilled in the art will readily understand. Such modifications and variations are considered to be within the purview and scope of the invention and the appended claims.

What is claimed is:

1. In an antifriction bearing having an inner ring with an extending locking flange and having a locking collar associated therewith, said ring having on its locking flange an eccentric camming surface and said locking collar having an annular flange with an eccentric camming surface which mates with that of the locking flange, the improvement which comprises, a thin layer of a soft metal selected from the group consisting of cadmium, zinc, indium, tin and lead on the bore of the inner ring, said layer being thicker in the region of the locking flange of the inner ring and the end opposite said locking flange than the thickness of the layer near the center region of the bore, whereby said thicker layer in the region of the locking flange may be flowably and lockably jammed against a shaft passing through said bore while minimizing fretting corrosion at the regions of the shaft against which the inner ring is jammed.

2. The improved bearing of claim 1 wherein the extending locking flange is coated with a thin layer of said soft metal.

3. The improved bearing of claim 2 wherein said inner ring has seal rabbets and said rabbets are coated with a thin layer of said soft metal.

4. The improved bearing of claim 3 wherein the soft metal is cadmium.

5. The improved bearing of claim 3 wherein the soft metal is zinc.

6. In an antifriction bearing having an inner ring with an extending locking flange and having a locking collar associated therewith, said ring having on its locking flange an eccentric camming surface and said locking collar having an annular flange with an eccentric camming surface which mates with that of the locking flange, the improvement which comprises, a thin layer of a soft metal selected from the group consisting of cadmium, zinc, indium, tin and lead on the bore of the inner ring of average plating thickness ranging from 0.0003 to 0.001 inch, said layer being thicker in the region of the locking flange of the inner ring and the end opposite said locking flange than the thickness of the layer near the center region of the bore by an amount ranging from 0.0002 to 0.0008 inch, whereby said thicker layer in the region of the locking flange may be flowably and lockably jammed against a shaft passing through said bore while minimizing fretting corrosion in the regions of the shaft against which the inner ring is jammed.

7. The improved bearing of claim 6 wherein the extending locking flange is coated with a thin layer of said soft metal.

8. The improved bearing of claim 7 wherein said inner ring has seal rabbets and said rabbets are coated with a thin layer of said soft metal.

9. The improved bearing of claim 8 wherein the soft metal is cadmium.

10. The improved bearing of claim 8 wherein the soft metal is zinc.

References Cited by the Examiner

UNITED STATES PATENTS 2,728,616  12/1955  Potter _____ 308—236

FOREIGN PATENTS 935,632  9/1963  Great Britain.

MARTIN P. SCHWADRON, *Primary Examiner.*

F. SUSKO, *Assistant Examiner.*